(12) United States Patent
Rickard (10) Patent No.: US 6,785,532 B1
(45) Date of Patent: Aug. 31, 2004

(54) POWER LINE COMMUNICATIONS (75) Inventor: Robin Paul Rickard, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/230,011

(22) PCT Filed: Jul. 25, 1997

(86) PCT No.: PCT/GB97/02028

§ 371 (c)(1),
(2), (4) Date: Sep. 20, 1999

(87) PCT Pub. No.: WO98/06188

PCT Pub. Date: Feb. 12, 1998

(30) Foreign Application Priority Data

Aug. 1, 1996 (GB) ............................. 9616142

(51) Int. Cl.[7] ................................................ H04M 9/00
(52) U.S. Cl. ...................... 455/402; 455/560; 379/23
(58) Field of Search ................................ 455/270, 402, 455/426.1, 560, 561; 379/23, 24, 26.01, 101.01, 93.36; 381/94.1, 94.9; 330/149–151

(56) References Cited

U.S. PATENT DOCUMENTS

| | | | |
|---|---|---|---|
| 4,258,328 A | 3/1981 | Prevot et al. ............... | 330/149 |
| 4,450,417 A | 5/1984 | Folkmann ................ | 333/24 R |
| 4,458,236 A | 7/1984 | Perkins .................. | 340/310.05 |
| 4,782,307 A | 11/1988 | Hsu ........................... | 330/151 |
| 5,166,634 A | 11/1992 | Narahashi et al. ........... | 330/151 |
| 5,706,354 A | 1/1998 | Stroehlein ................ | 381/94.1 |
| 5,832,364 A | 11/1998 | Gustafson .................. | 455/14 |
| 5,874,856 A | 2/1999 | Van Horn ................. | 330/151 |
| 6,285,252 B1 | 9/2001 | Huang ........................ | 330/149 |
| 6,392,483 B2 | 5/2002 | Suzuki et al. ............... | 330/151 |

FOREIGN PATENT DOCUMENTS

| | | | |
|---|---|---|---|
| DE | 25 23 090 | 1/1976 | |
| DE | 31 51 143 | 7/1983 | |
| EP | 295896 | 12/1988 | ............... 379/412 |

OTHER PUBLICATIONS

Morgan, "Adaptive Interference Cancellation For Power Line Carrier Communication Systems", IEEE Transactions On Power Delivery, vol. 6, No. 1, 1/91, pp. 49–61.

*Primary Examiner*—Charles Craver
(74) *Attorney, Agent, or Firm*—Barnes & Thornburg LLP (57) ABSTRACT

An apparatus for coupling signals to a transmission line, such as a power line (120). The apparatus comprises an input for receiving a wanted signal; a first coupler for coupling the wanted signal ($V_{main}$) onto the line at a first position (Y); a cancelling means ($W_B$, $W_R$, $W_Y$), coupled to the input, for deriving a cancelling signal ($V_{aux}$) from the wanted signal; a second coupler for coupling the cancelling signal onto the line at a second position (X), spaced from the first position; wherein the wanted signal and the cancelling signal destructively combine in a single direction of propagation along the line while enabling the wanted signal to propagate in the other direction along the line. The apparatus can be used to minimise radiation from an unshielded part of an electricity distribution network, such as substation (100), or to allow re-use of a frequency band on other power lines.

16 Claims, 9 Drawing Sheets

POWER LINE COMMUNICATIONS

TECHNICAL FIELD

This invention relates to an apparatus and method for coupling signals onto a transmission line. It has particular application to coupling radio frequency (RF) signals onto an electricity distribution network which is used to transport telecommunications signals.

BACKGROUND TO THE INVENTION

It is known to transport telecommunications signals over an electricity distribution or power transmission network. Patent Application WO 94/09572 A1 (NORWEB) describes such a network. Delivering a telecommunications service in this manner is attractive as it overcomes one of the greatest costs in providing a new telecommunications network i.e. installing cabling to each subscriber. Existing electricity distribution cabling is used to carry the telecommunications signals.

Figure 1:
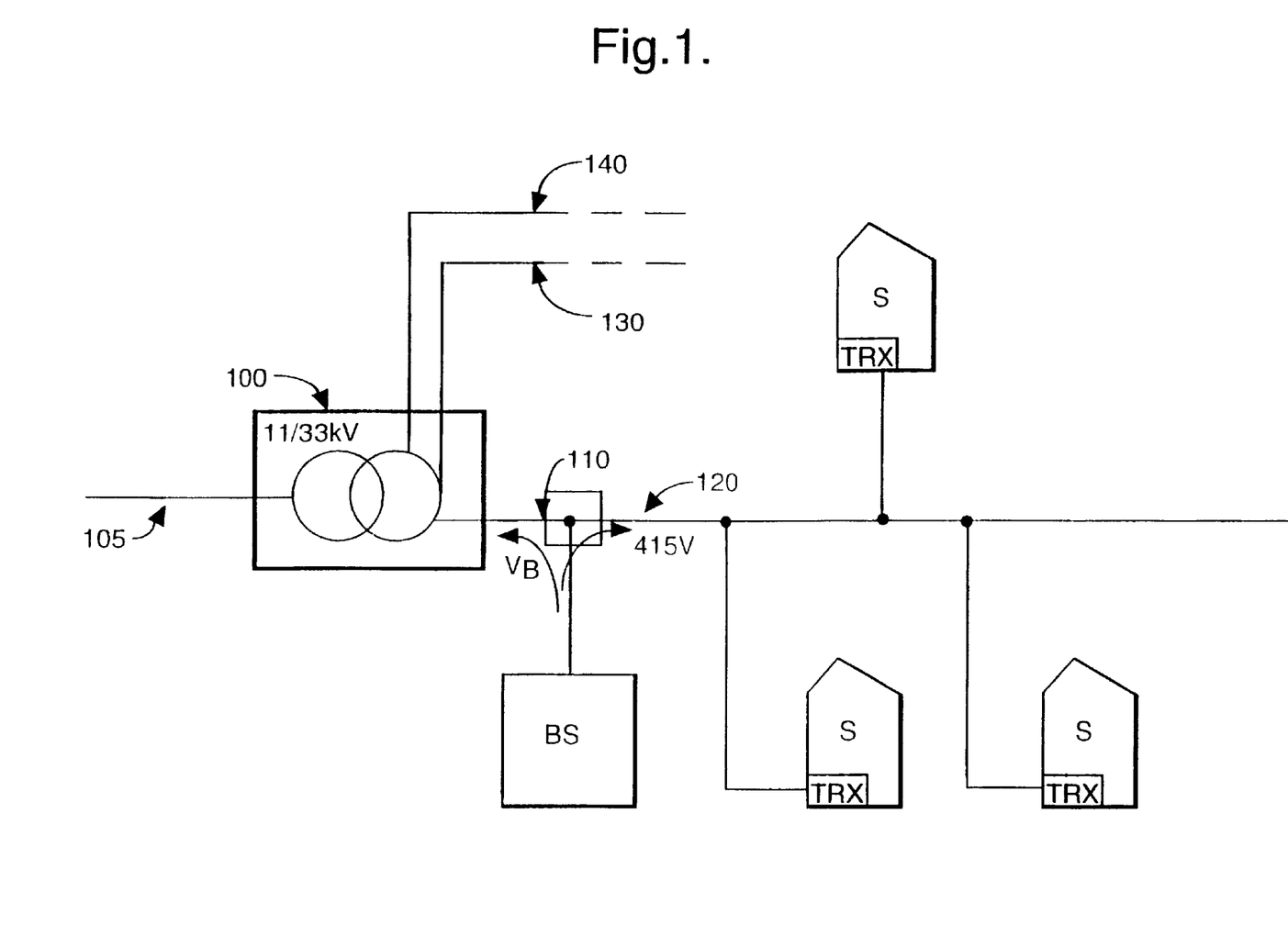
FIG. 1 shows an electricity distribution network which is adapted to transport telecommunications signals.

FIG. 1 shows an electricity distribution network which is adapted to carry telecommunications signals. Mains electricity enters the network from an 11 kV transmission line 105 and is transformed by substation 100 into a 415V supply which is delivered over cable 120 to subscribers S. A base station BS couples telecommunications signals $V_B$, such as voice and data signals, at injection point 110 onto distribution cable 120. The telecommunications signals propagate over the cable on radio frequency carriers to transceiver units TRX at subscriber premises S.

One of the problems with transporting RF signals over the electricity distribution network is that of unwanted radiation of RF energy. The distribution network was not designed to carry RF signals.

Electricity distribution cables, such as cable 120, have a concentric structure. The inner section of the cable comprises groups of conductors which carry one or more of the three supply phases. This inner section is surrounded by an outer section which is coupled to earth. These cables have similar screening properties to coaxial cables, and conveniently this screening, coupled with the underground burial of the cables, is effective at the radio frequencies (RF) that are used for transporting telecommunications signals.

The internal wiring at subscribers' premises S is unscreened, and could potentially cause radiation problems. However, by filtering off the RF signals at the point where the electricity feeder cable becomes unscreened radiation of RF signals is minimised.

The other significant point where radiation can occur is at the substations 100 where electricity is transformed from 11 kV to 415V. Substations have busbars which are typically mounted as a grid array on the substation wall. The busbars are shielded from view but frequently are electrically unscreened. This is because screening is considered unnecessary at the 50 Hz mains frequency. At RF frequencies the busbar array functions as an antenna, radiating the RF signals which it receives via the distribution cables into the surrounding area. This is a undesirable as it causes interference with equipment operating at these frequencies. This radiation may also violate regulations on Electromagnetic Compatibility (EMC).

One of the solutions to minimise radiation from the busbars is to screen the busbar array, or to screen the entire substation building. Some modern substations are equipped with metal casing around the busbars. However, the majority of substations are unscreened brick structures. It is undesirable to renovate all of these structures to improve their screening as it increases the cost of providing a telecommunications service over the network.

An alternative solution to the radiation problem is to restrict the power at which the RF signals are transmitted over the network, such that radiation occurring at substations falls below acceptable limits. This causes problems with subscribers' equipment, particularly to those subscribers furthest from the point at which RF signals are injected onto the network. Subscriber equipment needs an acceptable signal to interference ratio in order to detect the wanted RF signals. With considerable interference on the network, this demands a reasonably high transmit power.

The problem of radiation at the substation is compounded by the fact that RF signals are usually injected onto the distribution network adjacent to the substation. The reason for injecting at this point is because one base station can easily be coupled to each of a group of 415V cables (120, 130, 140 in FIG. 1) which all converge at the substation.

A paper entitled "Adaptive Interference Cancellation for Power Line Carrier Communication Systems" at pp. 49–61 of IEEE Transactions on Power Delivery, Vol 6, No 1, January 1991, addresses the problem of frequency reuse in a power line carder system. A portion of a transmitted signal or a first line section which leaks through a line trap onto a second line section is cancelled by applying a cancelling signal to the second line section.

DE 2 523 090 describes a directional signal generator which controllably propagates in ore direction along a line. This uses an attenuator network in series with the line.

SUMMARY OF THE INVENTION

The present invention seeks to minimise the above problem.

According to a first aspect of the present invention there is provided an apparatus for coupling signals to a line, the apparatus comprising:

an input for receiving a wanted signal;

a first means for coupling the wanted signal onto the line at a first position;

a cancelling means, coupled to the input, for deriving a cancelling signal from the wanted signal, the cancelling means being operable to phase-shift the wanted signal;

a second means for coupling the cancelling signal onto the line at a second position, spaced from the first position;

and wherein the apparatus is arranged so that the combination of the phase-shift and propagation delays experienced by the signals causes the wanted signal and the cancelling signal to destructively combine in a single direction of propagation along the line while enabling the wanted signal to propagate in the other direction along the line.

Preferably the cancelling means comprises a weight which is operable to scale the wanted signal in amplitude.

Preferably the spacing of the first and second couplers is substantially one quarter of a wavelength of the wanted signal. This maximises signal power in the wanted direction of propagation.

Preferably the apparatus also has a monitor for sensing the combination of the wanted and cancelling signals at a position on the line and feeding the sensed signal to a calculating means which controls the cancelling means. This allows a more effective cancellation.

The calculating means can perform an iterative technique in which perturbations are applied to the value of the weights and the sensed signal is monitored to determine the effect of the perturbations.

The calculating means may alternatively perform an iterative technique in which the sensed signal is correlated with a portion of the wanted signal to determine updated weight values.

Preferably the apparatus is used to couple telecommunications signals to a power line such as a distribution line of an electricity distribution network for serving a plurality of subscribers.

In the situation where the telecommunications signals are coupled onto the electricity distribution network at a position between an unshielded part of the network and the subscribers, and the wanted and cancelling signals destructively combine in the direction of the unshielded part, this prevents unwanted radiation of signals from the unshielded part of the network.

A further application of controlling the direction of propagation of signals along the line is in allowing a particular frequency band which is in use on one line to be reused on the other lines. This has a particular use where an electricity distribution network has several distribution lines served by a common substation.

A further aspect of the invention provides a method of coupling signals to a line, the method comprising:

receiving a wanted signal at an input;

coupling the wanted signal onto the line at a first position;

deriving, at a cancelling means, which is coupled to the input, a cancelling signal from the wanted signal, the cancelling means being operable to phase-shift the wanted signal;

coupling the cancelling signal onto the line at a second position. spaced from the first position;

and wherein the combination of the phase-shift and propagation delays experienced by the signals is arranged such that the wanted signal and the cancelling signal destructively combine in a single direction of propagation along the line while enabling propagation of the wanted signal along the line in the other direction.

A further aspect of the invention provides a method of coupling communications signals on to an electricity distribution network comprising a substation serving a plurality of distribution lines, the method comprising:

coupling communications signals occupying a frequency band to one of the lines by coupling a wanted communications signal onto the line at a first position and coupling a cancelling signal onto a line at a second position, spaced from the first position such that the wanted communications signal and cancelling signal destructively combine in a direction of propagation towards the substation; and, reusing the frequency band for coupling different communications signals on to another one of the plurality of lines.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

Figure 2:
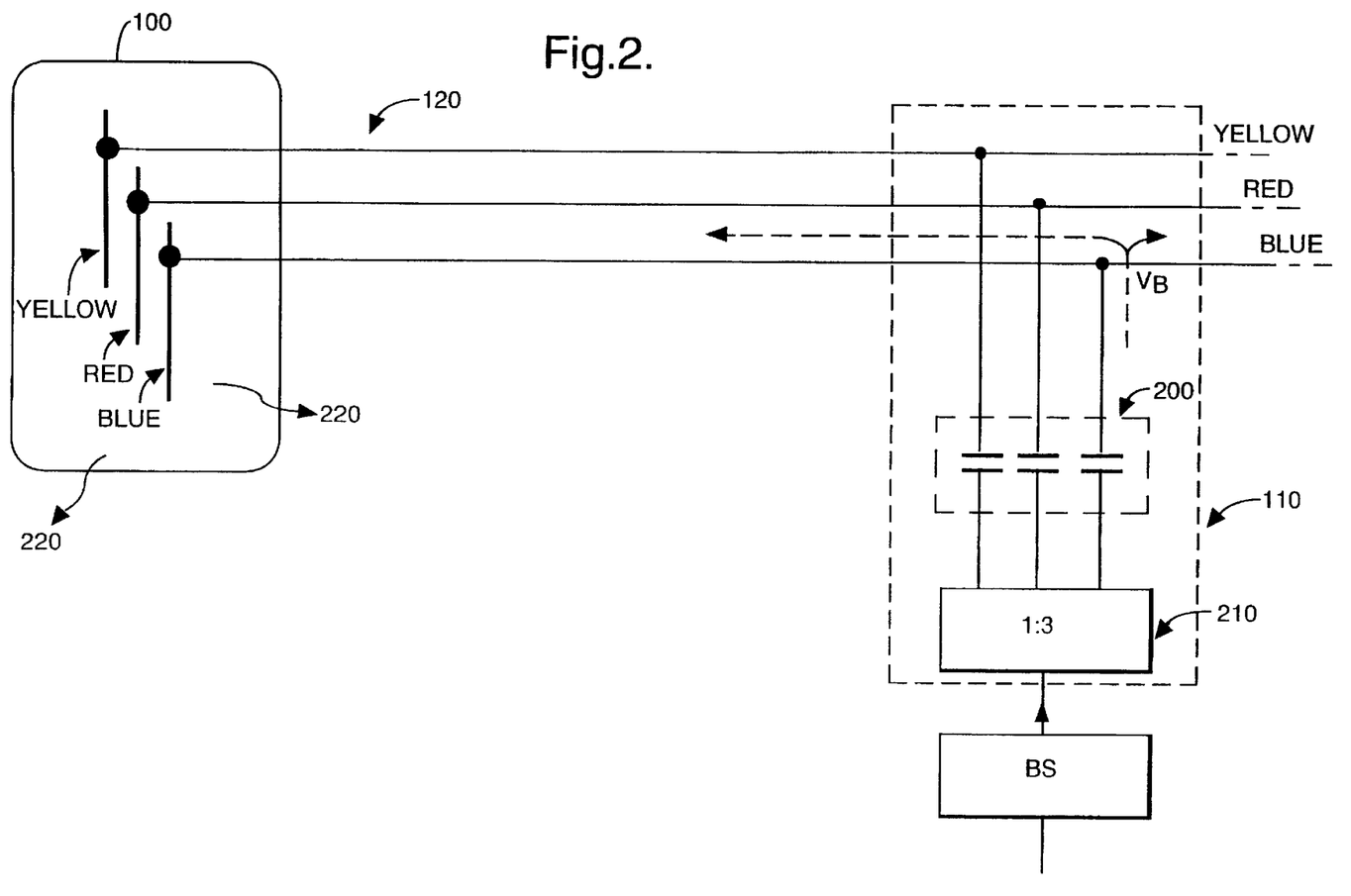
FIG. 2 shows part of the network of FIG. 1 in more detail.

Referring again to FIG. 1, this shows an electricity distribution network which transports telecommunications signals. FIG. 2 shows part of this network in more detail. Distribution cable 120 has three separate phase lines: Blue, Red and Yellow. Each of the phase lines are coupled to a respective busbar in substation 100. The output of basestation BS is coupled to a three-way splitter 210. Each of the three output lines is coupled, via a high-pass filter unit 200 to a respective phase line of cable 120. The mains filter serves to pass only signals in the RF bands which are used for transmission of telecommunications signals and to block the flow of mains electricity into the basestation. Telecommunications signals propagate along cable 120 in two directions; towards substation 100 and towards subscribers. Signal $V_B$ is shown on the blue phase line. Telecommunications signals reaching substation 100 radiate RF energy 220.

Figure 3:
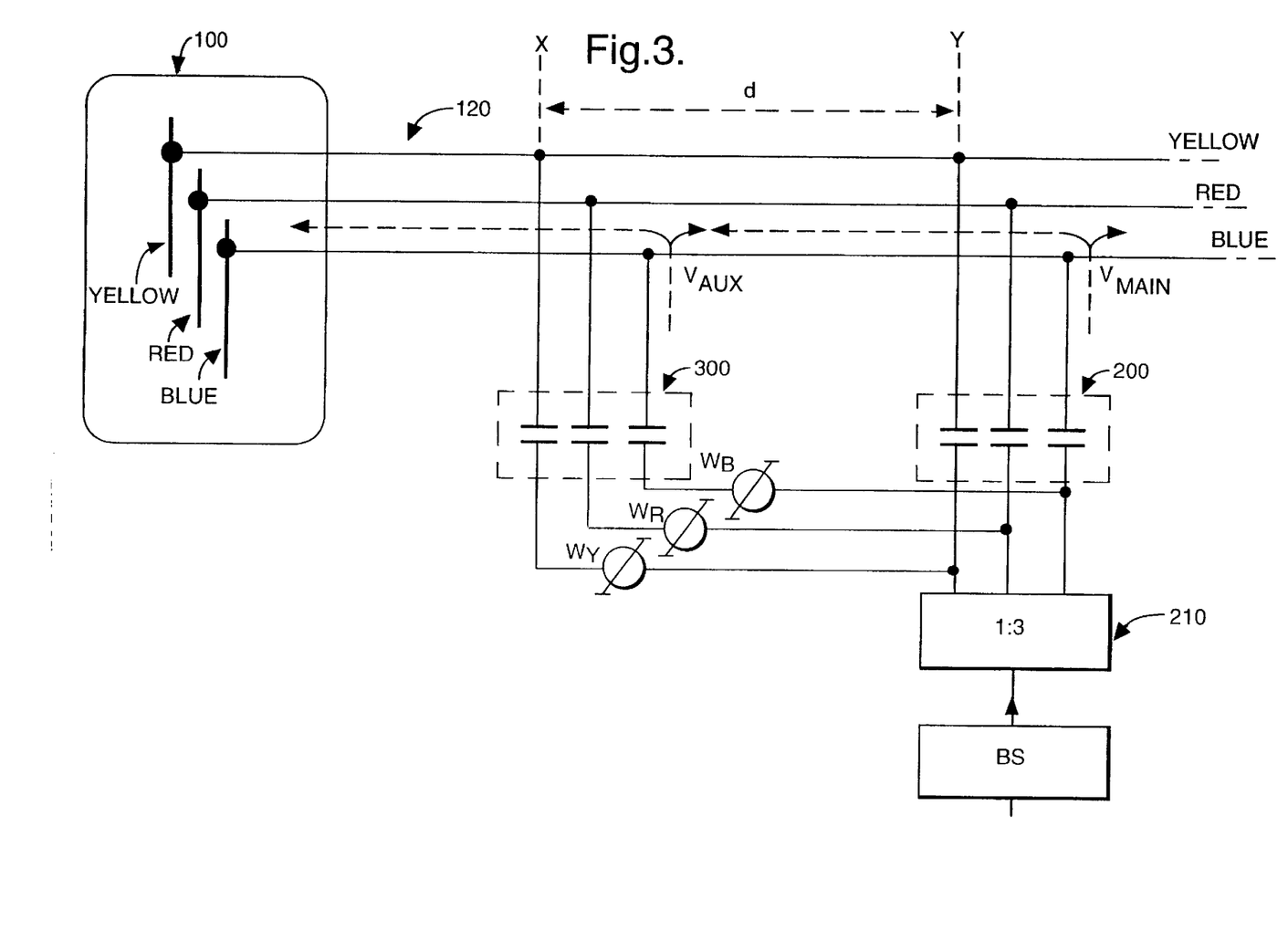
FIG. 3 shows an, arrangement to minimise radiation from an unscreened part of the network of FIGS. 1 and 2.

FIG. 3 shows the same section of the network as that shown in FIG. 2, but with modifications to minimise propagation of RF signals along cable 120 towards substation 100.

The output of basestation BS is split, as before, into a feed for each phase line. The feed for each phase line is split into two components; a main component $V_{main}$, and a cancelling component $V_{aux}$. $V_{main}$ couples to cable 120 at position Y via a high-pass filter 200, as before. $V_{aux}$ is coupled to cable 120 at a position X, spaced from position Y by a distance d. $V_{aux}$ is weighted by a weight $W_B$ which phase-shifts the signal, and can also scale the signal in amplitude. $V_{aux}$ and $V_{main}$ are related in phase such that at point X, and in the direction towards substation 100, $V_{aux}$ and $V_{main}$ are offset in phase by 180° i.e. they are in anti-phase and destructively cancel. Therefore, the section of cable between point X and the busbars carries no RF signals, or RF signals at much reduced levels. Point X could be located at the busbars themselves.

Joints at points X and Y should be made using the same jointing technique, such that the RF coupling characteristics track in amplitude and phase. This gives optimum broadband cancelling performance.

By appropriate spacing of the main and auxiliary signal feeds, and appropriate phase-shifting at the weight, a further advantage can be gained. $V_{main}$ and $V_{aux}$ can be related in phase such that at point Y (and along the cable towards subscribers) they are in phase i.e. they constructively combine.

Typical transmission frequencies are the bands 2–6 MHz and 10–14 MHz. The optimum performance, with cancellation in the direction towards the substation and constructive interference in the direction towards the subscribers is achieved with the feed spacing d=λ/4 and a weighting phase-shift of 180°. The typical level at which the main signal can be coupled onto the line is 1 Vrms. Such a high level may cause radiation problems in conventional systems.

Figure 4:
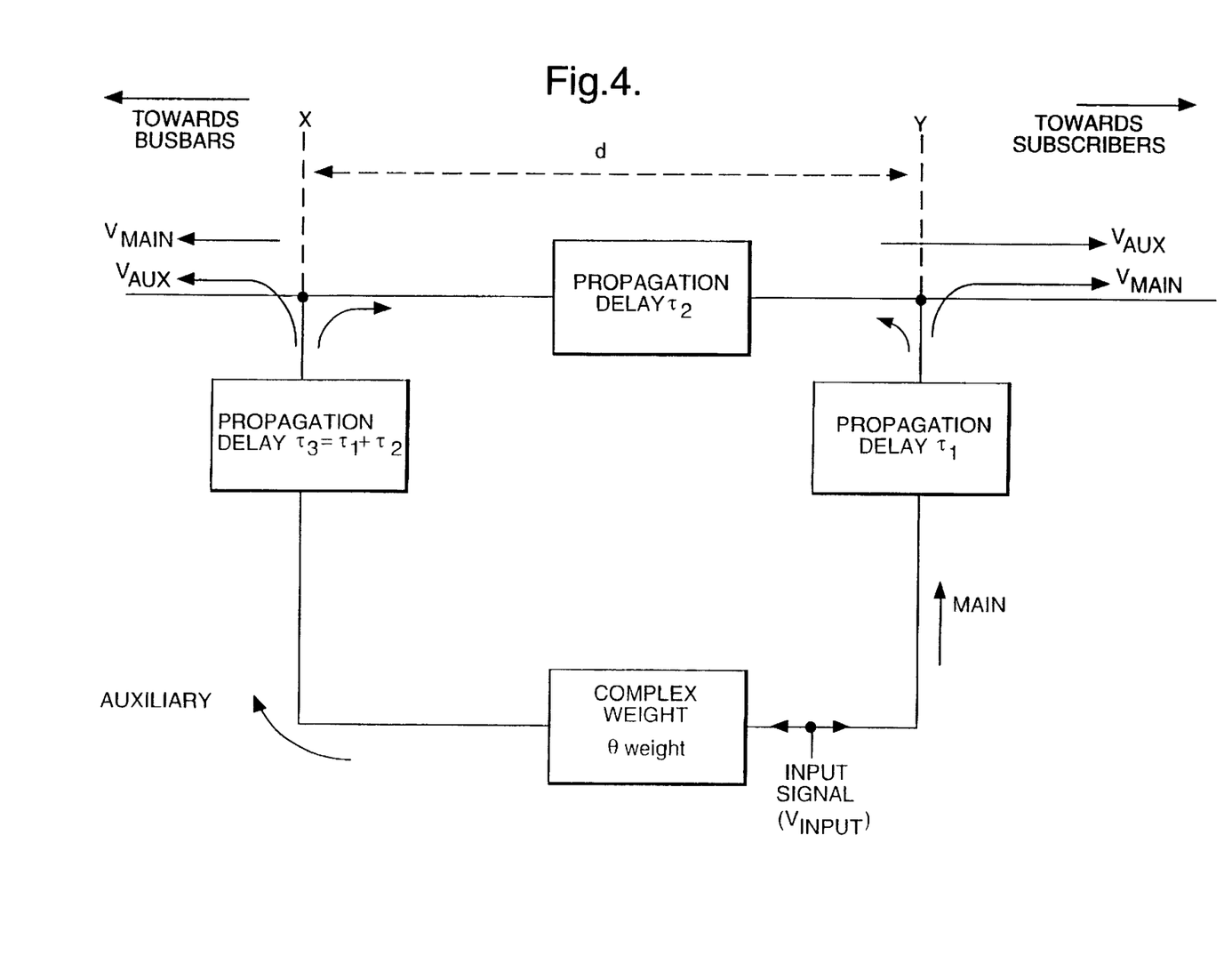
FIG. 4 describes the operation of the arrangement of FIG. 3.

The operation of the system will now be described further with reference to FIG. 4. Considering FIG. 4, the delays and phase shifts are arranged such that signals injected from the main feed and the auxiliary feed, and propagating towards the bus bars from point X, destructively interfere, but the signals propagating along cable 120 away from the bus bars do not destructively interfere. By arranging distance d to be approximately d=λ/4, the signals propagating in the direction towards the subscribers will be maximised. Cancellation at point X can be achieved for any distance d. At one extreme, it is possible to reduce the feed separation distance so that both feeds can be coupled to the cable within a distance which is small enough to fit within a section of cable exposed by the digging of a single hole.

Let us consider the main and auxiliary paths from the signal input to point X. When passing through the main path, signals undergo delay $\tau_1$, in the feed cable, and delay $\tau_2$ propagating through distance d to point X. The auxiliary path is arranged such that the feed delay to point X is equal to $\tau_1+\tau_2$. By setting the weight θ weight to give a 180° phase shift, it can be seen that ideally broadband cancellation between the signals propagating along the two paths to X can be achieved. In practice the weight value in phase and amplitude can be adjusted by an adaptive loop to compensate for mismatches between the feed paths. Alternatively, a fixed phase shift of 180° and zero attenuation can be set.

Now let us consider the main and auxiliary paths to point Y. Signals propagating along the main feed are delayed by $\tau_1$. Signals propagating through the auxiliary path are delayed by $\tau_1+\tau_2$ to point X, and by a further $\tau_2$ when propagating through distance d to point Y, giving a total delay of $\tau_1+2\tau_2$. In addition, the signals propagating through the auxiliary feed are phase shifted by 180°. At point Y, therefore, the two components of the input signals are combined, one of which is delayed by $\tau_1$, and a second component which is delayed by $\tau_1+2\tau_2$, and also phase shifted by 180°. The magnitude of the resultant signal will depend on the carrier frequency, with the maximum amplitude occurring when the delay $2\tau_2$ produces a phase shift of 180°, such that when combined with the phase shift through the weight a total phase shift of 360° is obtained giving constructive interference. Constructive interference occurs when the phase difference is 0° or a multiple number of whole wavelengths. This requires a separation distance of d=λ/4. Hence optimum transmission in the desired direction will be obtained with separation of d=λ/4, but useful performance will still be obtainable with other separations, except in the extreme case with zero separation.

Figure 5:
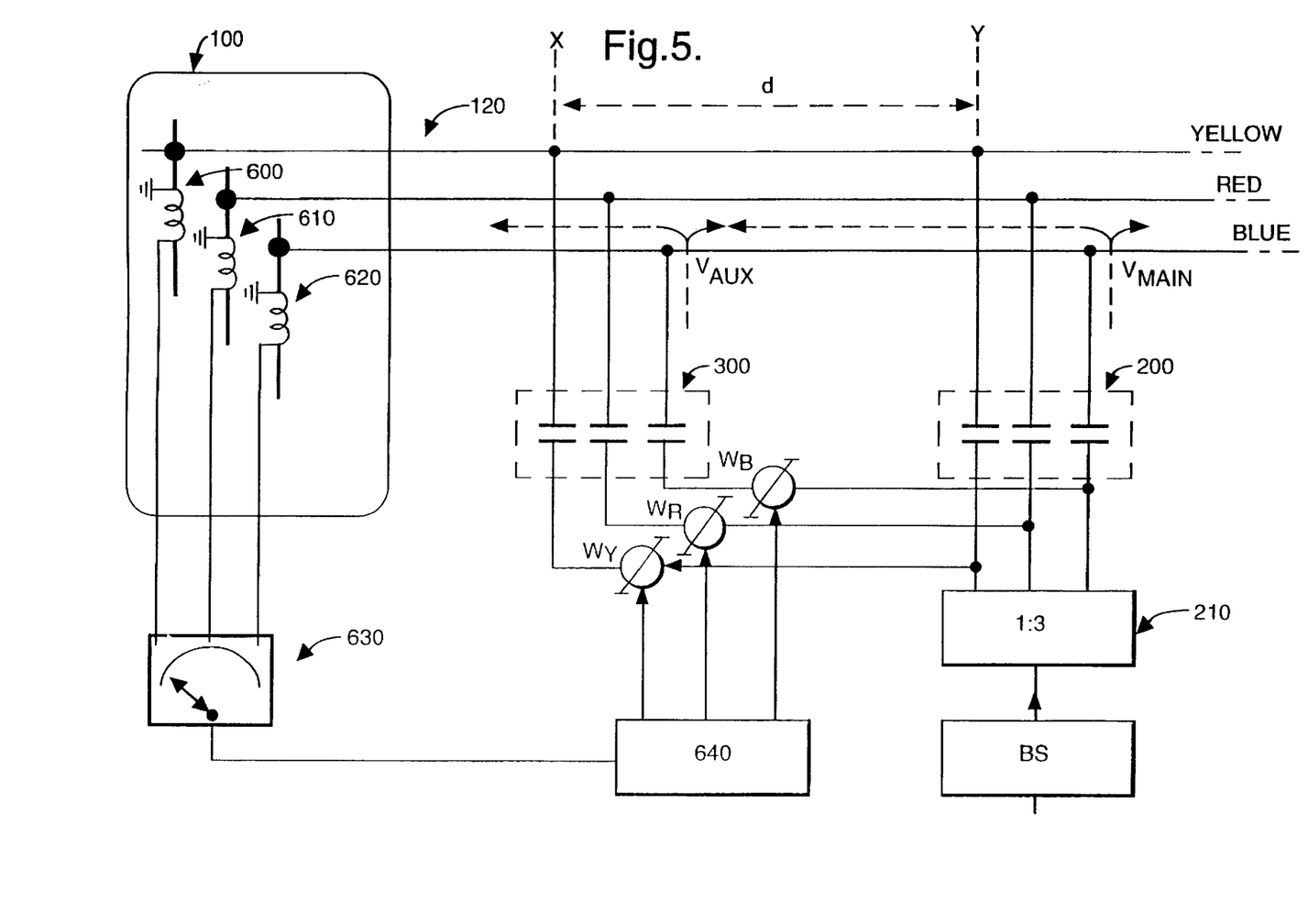
FIG. 5 shows the arrangement of FIG. 3 modified to include a monitoring circuit.

FIG. 5 shows the arrangement of FIG. 3, further modified so that it is possible to monitor the success of the cancellation process.

Sensing coils 600, 610, 620 are arranged, one per phase line, to detect signals present on the busbar. The sensing should preferably be by an inductive coil which is wound around the busbar, or laid closely adjacent to it. Sensing is also possible by a capacitive link or by one or more antennas located close to the busbars.

Each sensing coil is coupled to a switch 630 and a weight calculation unit 640. The weight calculation unit outputs control signals to each of the weights, $W_B$, $W_R$, $W_Y$. Switch 630 allows a single calculation unit to be time-shared among the monitoring signals. Calculation unit 640 operates to apply weight values which minimise the level of the monitoring signal detected by the sensing coils. An attenuated signal is adequate for monitoring, and this allows weakly coupled inductive coils to be used.

While it is preferable to sense at the unscreened section of the network where radiation is likely to occur, it is also possible to sense at another point nearer position X, or even at position X itself. However, because cable 120 is reasonably well screened, another form of sensing device would be needed, such as a capacitive link.

The operation of the weight calculation unit 640 will now be described. There are two main methods of calculating weight values; by perturbation and by a correlation technique.

Figure 6:
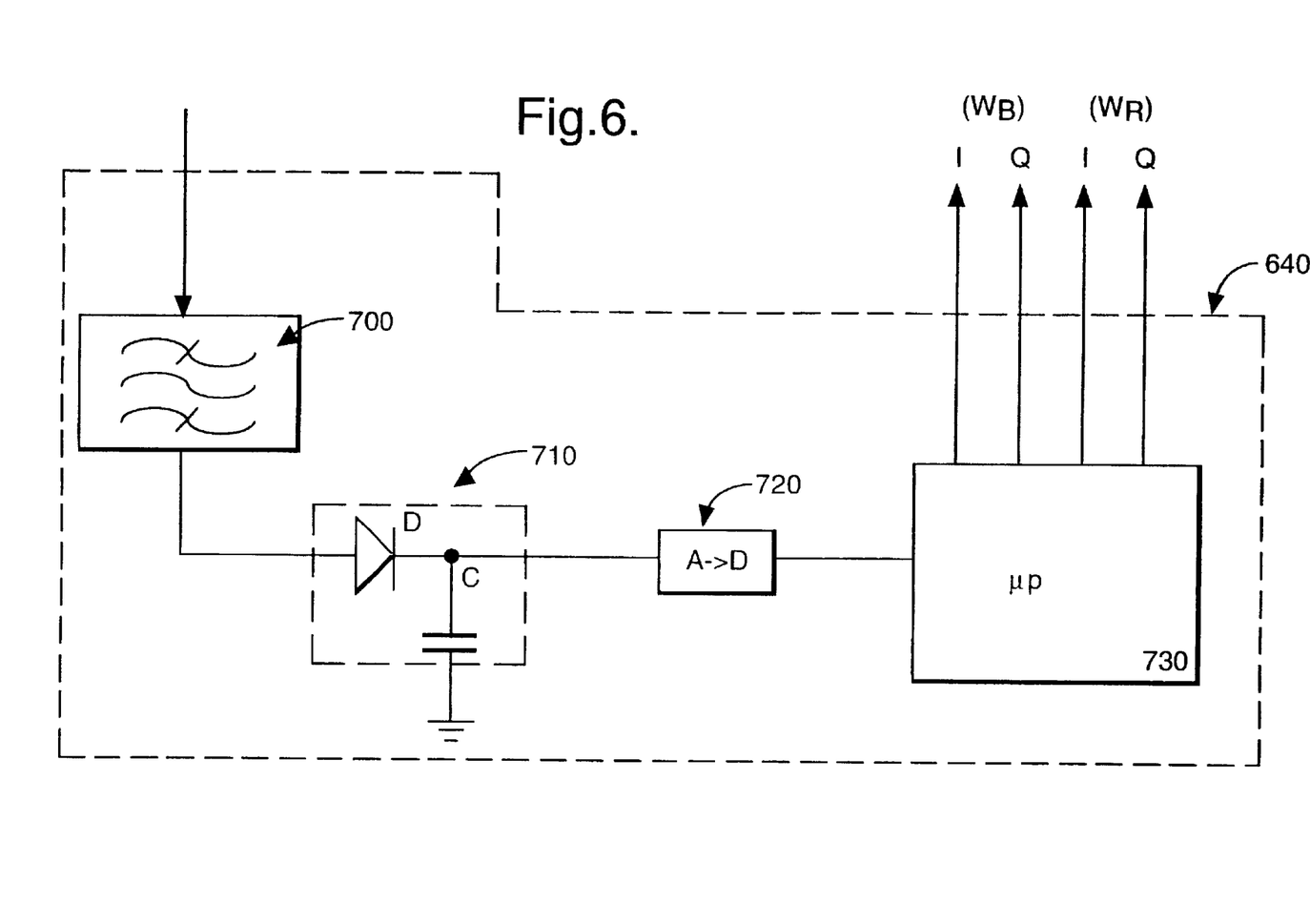
FIG. 6 shows one form of calculating circuit for use in the arrangement of FIG. 5.

FIG. 6 shows a weight cancelling unit which performs the perturbation technique. A monitoring signal is applied to a channel filter 700, which passes only those frequencies which are of interest (the RF frequencies which are to be cancelled). A power detector 710, shown simply as a diode detector D and capacitor C, provide a power measurement which is applied to an analogue to digital converter 720. The output of the A–D converter is fed to a microprocessor 730 which performs a perturbation algorithm. The microprocessor outputs a set of weight control signals which control the in-phase (I) and quadrature (Q) elements of each weight. The perturbation process works by applying steps in the size of I and o weight values and monitoring how that affects the cancellation. The algorithm can work by successively changing I up, I down, Q up, Q down. After these four steps have been performed the change in I or Q which had the best effect is adopted. This process continues until the best cancellation effect is achieved.

Figure 7:
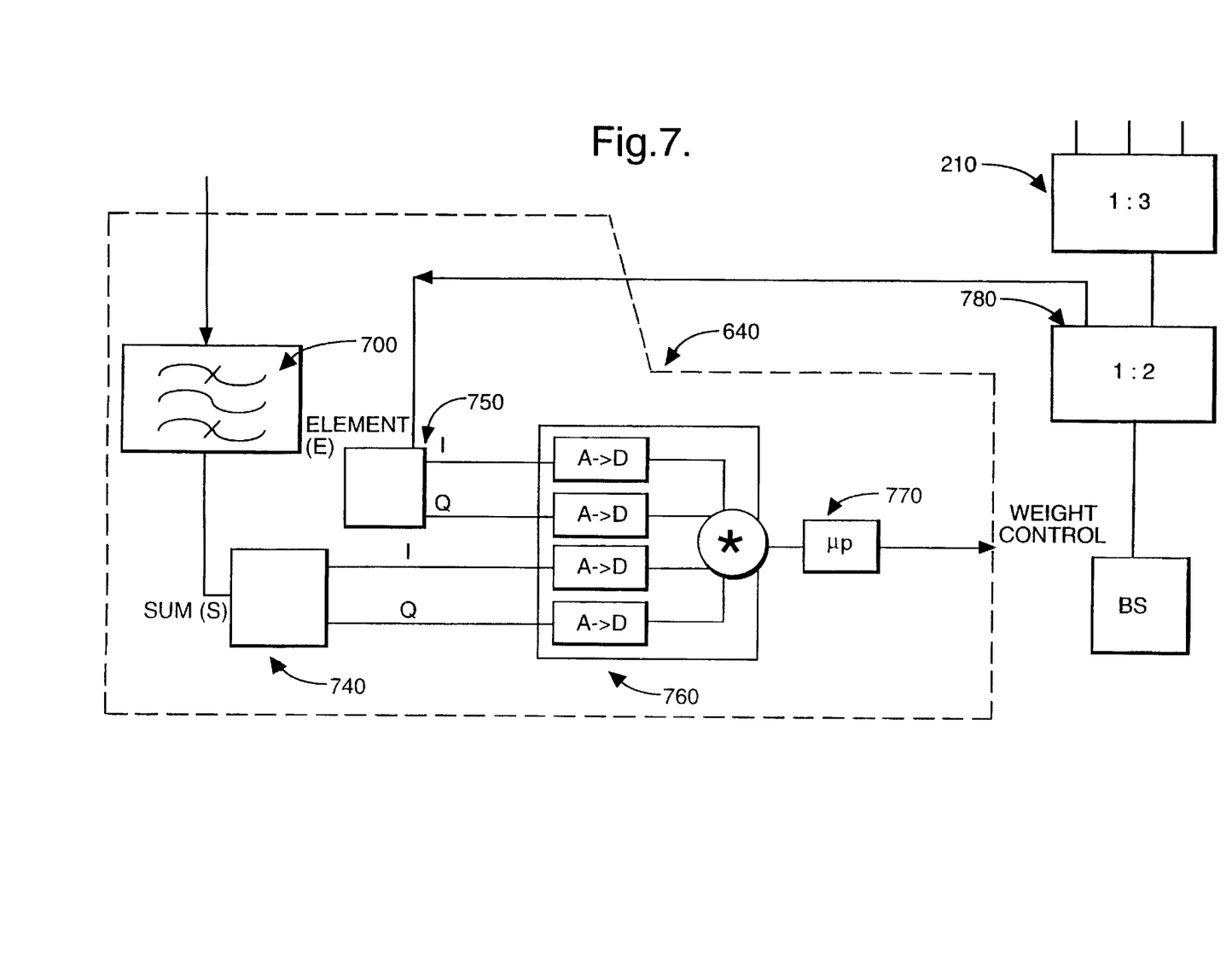
FIG. 7 shows an alternative form of calculating circuit for use in the arrangement of FIG. 5.

The second technique for calculating weight values is by correlation. This is shown in FIG. 7. As with the perturbation technique, an input from the sensing coils is applied to a filter, which passes only the band of RF frequencies which are of interest. The filtered signal is split, by a coupler 740 into in-phase (I) and quadrature (Q) components. This forms the sum component (S). A portion of the input signal from the basestation BS is split by splitter 780 and fed into a second coupler 750 which also splits the signal into I and Q components. This forms the element component (E). The two sets of I and Q components are fed to a correlator 760. A–D converters operate on each of the four inputs to the device. The correlator performs a correlation of the E and S components and outputs the result to a microprocessor 770 which performs a weight update algorithm. A typical algorithm is:

$$W_{(K+1)}=W_{K-\mu}E*S$$

where E*S is the correlation function.

Microprocessor 770 outputs a set of control signals to control the value of the weights. This technique, similarly to the perturbation technique, is iterative, and is repeated until the best cancellation is achieved.

Once the weight values have been set, the weight calculation process should only need to be repeated periodically.

Cancellation is most effective at the carrier frequency where the main and auxiliary signals are exactly in antiphase. Moving each side of this frequency the cancellation effect will be decreasingly less effective. This is due to imperfections in the tracking over frequency between the phase and amplitude responses of the main and auxiliary channels and due to mismatch in the delay. Preferably the centre frequency of the band is chosen as the frequency where cancellation is most effective, e.g. 4 MHz for the band 2–6 MHz. This scheme is therefore most effective with TDMA systems such as DECT, which employ a limited number of time-shared carriers. A broader band cancellation is possible by modifying the arrangement as shown in FIG. 8.

Figure 8:
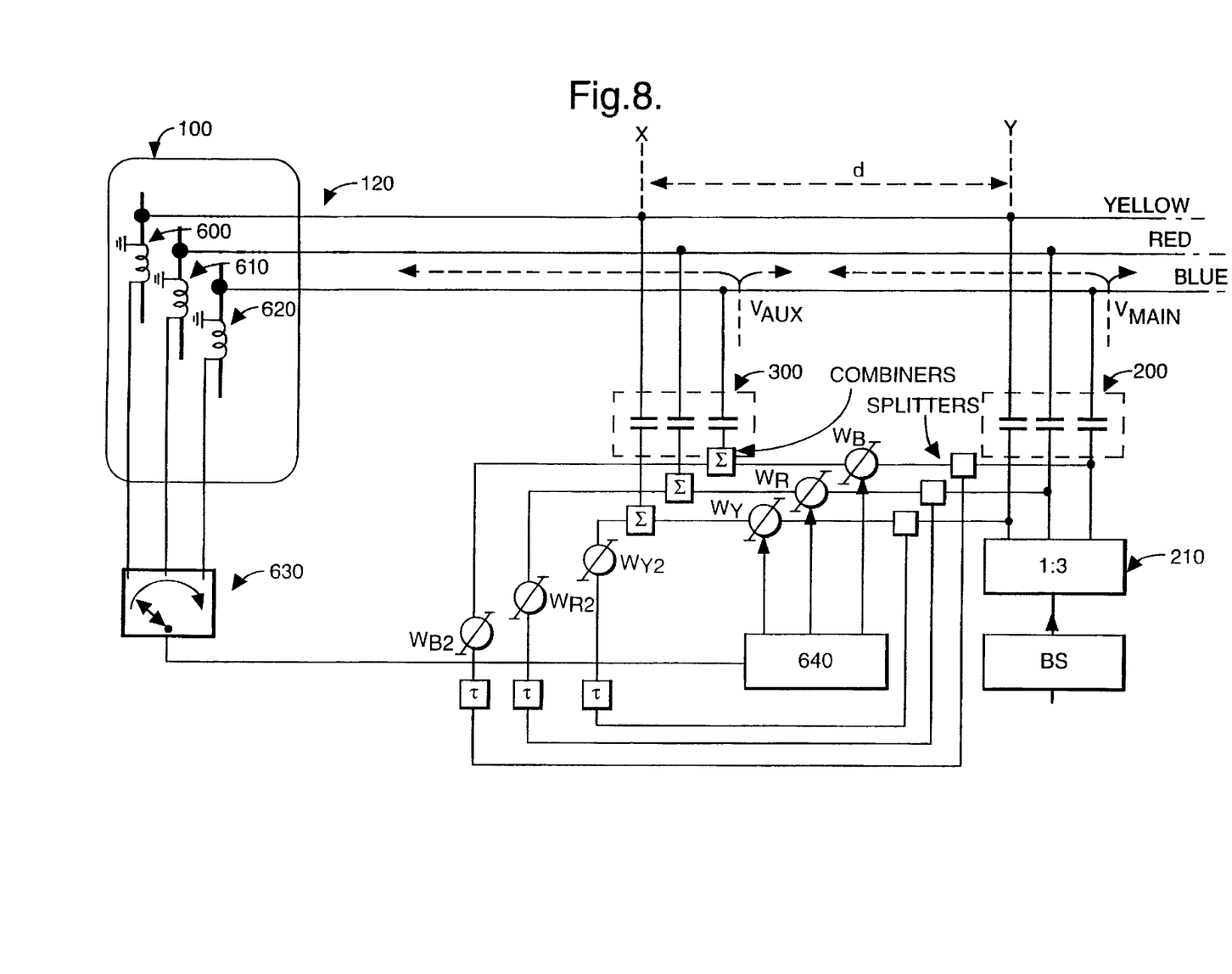
FIG. 8 shows an improvement to the arrangement of FIG. 5.

In FIG. 8, the signals in the auxiliary path are split into several portions, which are each delayed by differing amounts and separately weighted before recombination. The weights are under the under control of the adaptive loop, and adapted in turn in a time-shared manner.

It is proposed to use time division multiple access (TDMA) or time division duplex (TDD) transmission schemes such as DECT or CT2. This is because these schemes use a single carrier for transmission in both the upstream and downstream directions. This simplifies filtering equipment which is needed at the subscriber premises. It is the downstream transmissions from the basestation to subscriber premises which causes radiation problems because high power RF signals are injected near to the substation. Upstream transmission from subscribers to the basestation arrive at the basestation at low levels which should not cause radiation problems. The subscribers located nearest to the basestation are controlled such that their transceivers transmit at a lower level compared with other transceivers located further from the base station.

Cancellation is operable during the period when the base station is transmitting downstream. During the basestation receive period, when subscribers transmit upstream, the auxiliary path is not used and the basestation receives only via the main path.

Alternatively, the auxiliary path can be utilised in addition to the main path during the receive cycle. In this case, the auxiliary path needs to establish the same amplitude and phase response in both receive and transmit directions.

The effect will be to prevent reception of signals from the direction of the bus bars, and to preferentially receive signals originating from the subscriber oh cable 120.

Figure 9:
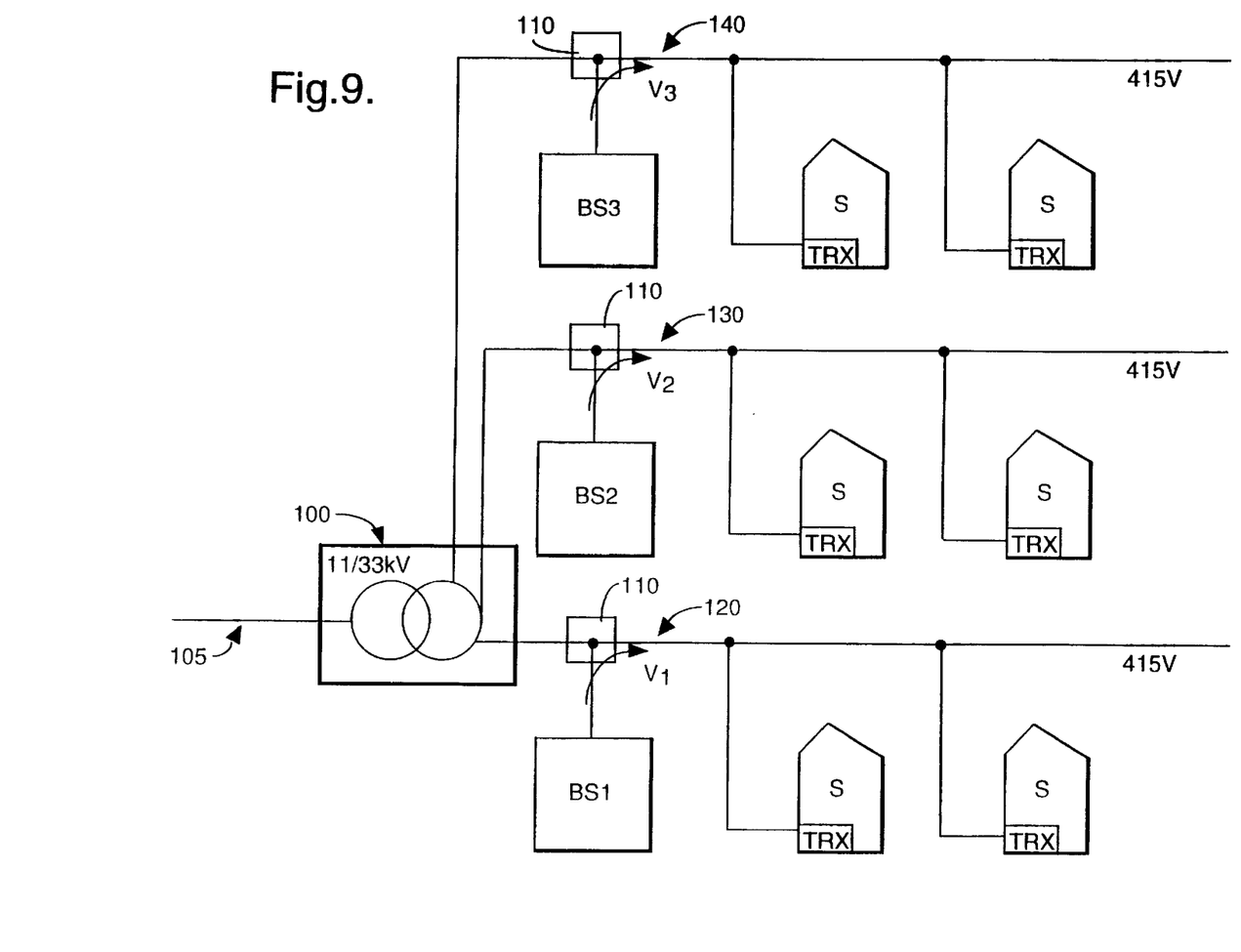
FIG. 9 shows frequency reuse in an electricity distribution network.

Transmitting telecommunications signals in one direction along a power line has two main applications. Firstly, by transmitting only in a direction away from the substation radiation from the substation is minimised. Secondly, by transmitting only in a direction away from the substation, it is possible to reuse the same band of frequencies on several power lines. FIG. 9 shows an electricity distribution network with a substation 100 which serves three distribution cables 120, 130, 140. Each distribution cable is served by a respective communications base station BS1, BS2, BS3. The common coupling of cables 120, 130, 140 at substation 100 means that telecommunications signals from one line, eg line 120, will flow onto the other lines 130, 140. Coupling telecommunications signals onto each line so that they propagate away from the substation, and have a negligible component in the direction towards the substation, allows the same frequency band to be used by each base station BS1, BS2, BS3. Frequency reuse may be desirable where traffic demand from the subscribers on each line requires a base station to serve just that line, but there is only a limited band of frequencies available for power line communication. The limit on the band of frequencies for power line communications may be due to government regulations or because it is found that a particular band of frequencies offers optimum performance.

In FIG. 9 signals $V_1$, $V_2$, $V_3$ represent the directional transmissions from base stations BS1, BS2, BS3 which can each share a common frequency band.

What is claimed is:

1. Apparatus for coupling signals to a line, the apparatus comprising:

an input for receiving a wanted signal;

a first means for coupling the wanted signal onto the line at a first position;

a cancelling means, coupled to the input, for deriving a cancelling signal from the wanted signal, the cancelling means being operable to phase-shift the wanted signal;

a second means for coupling the cancelling signal onto the line at a second position, spaced from the first position and wherein the apparatus is arranged so that the combination of the phase-shift and propagation delays experienced by the signals causes the wanted signal and the cancelling signal to destructively combine in a single direction of propagation along the line while enabling the wanted signal to propagate in the other direction along the line.

2. Apparatus according to claim 1 wherein the cancelling means is operable to scale the wanted signal in amplitude.

3. Apparatus according to claim 1 wherein the spacing of the first and second couplers is substantially one quarter of a wavelength of the wanted signal.

4. Apparatus according to claim 1 further comprising a monitor for sensing the combination of the wanted and cancelling signals at a position on the line and feeding the sensed signal to a calculating means which controls the cancelling means.

5. Apparatus according to claim 4 wherein the cancelling means comprises a weight and the calculating means performs an iterative technique in which perturbations are applied to the value of the weight and the sensed signal is monitored to determine the effect of the perturbations.

6. Apparatus according to claim 5 wherein the calculating means performs an iterative technique in which the sensed signal is correlated with a portion of the wanted signal to determine updated weight values.

7. Apparatus according to claim 1 wherein the line comprises a power line and the wanted signal comprises a telecommunications signal.

8. An electricity distribution network for sensing a plurality of subscribers, the network incorporating an apparatus according to any one of the preceding claims, and wherein the wanted signal comprises a telecommunication, signal which is coupled onto a distribution wire of the network.

9. An electricity distribution network according to claim 8 wherein the telecommunications signal is coupled onto the network at a position between an unshielded part of the network and the subscribers.

10. An electricity distribution network according to claim 8 wherein the distribution cable comprises a plurality of phase lines, and wherein the apparatus for coupling signals is coupled to one of the phase lines.

11. An electricity distribution network according to claim 8 wherein the distribution cable comprises a plurality of phase lines, and wherein there is one apparatus for coupling signals coupled to each one of the phase lines, there also being a monitor for sensing the combination of the wanted and cancelling signals at a position on each of the phase lines and a single calculating means which controls the cancelling means, wherein there is a switch which is operable to selectively connect the sensed signal from one of the monitors to the calculating means.

12. A method of coupling signals to a line, the method comprising:

receiving a wanted signal at an input;

coupling the wanted signal onto the line at a first position;

deriving, at a cancelling means, which is coupled to the input, a cancelling signal from the wanted signal, the cancelling means being operable to phase-shift the wanted signal;

coupling the cancelling signal onto the line at a second position, spaced from the first position;

and wherein the combination of the phase-shift and Propagation delays experienced by the signals is arranged such that the wanted signal and the cancelling signal destructively combine in a single direction of propagation along the line while enabling propagation of the wanted signal along the line in the other direction.

13. A method according to claim 12 wherein the line comprises a power line and the wanted signal comprises a telecommunications signal.

14. A method of coupling communications signals on to an electricity distribution network comprising a substation serving a plurality of distribution lines, the method comprising:

coupling communications signals occupying a frequency band to one of the lines by coupling a wanted communications signal onto the line at a first position and coupling a cancelling signal onto a line at a second position, spaced from the first position such that the wanted communications signal and cancelling signal destructively combine in a direction of propagation towards the substation; and, reusing the frequency band for coupling different communications signals on to another one of the plurality of lines.

15. Apparatus for coupling telecommunications signals to a power line, the apparatus comprising:

a first means for coupling a wanted telecommunications signal onto the power line at a first position;

a second means for coupling a cancelling signal onto the power line at a second position, spaced from the first position;

wherein the wanted telecommunications signal and the cancelling signal are arranged to destructively combine in a single direction of propagation along the power line while enabling the wanted signal to propagate in the other direction along the power line.

16. A method of coupling telecommunications signals to a power line, the method comprising:

coupling a wanted telecommunications signal onto the power line at a first position;

coupling a cancelling signal onto the power line at a second position, spaced from the first position;

and wherein the wanted telecommunications signal and the cancelling signal are arranged to destructively combine in a single direction of propagation along the power line while enabling propagation of the wanted signal along the power line in the other direction.

* * * * *